United States Patent
Wilson

(10) Patent No.: US 6,817,583 B2
(45) Date of Patent: Nov. 16, 2004

(54) INTERIOR TRIM ATTACHMENT APPARATUS AND METHOD FOR A VEHICLE

(75) Inventor: Douglas J. Wilson, Ft. Gratiot, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/246,161

(22) Filed: Sep. 18, 2002

(65) Prior Publication Data

US 2004/0051338 A1 Mar. 18, 2004

(51) Int. Cl.⁷ .................................................. B60J 3/02
(52) U.S. Cl. .............................. 248/231.9; 248/289.11; 296/97.9
(58) Field of Search ............................ 248/200, 231.9, 248/289.11, 291.1; 296/97.9

(56) References Cited

U.S. PATENT DOCUMENTS

| | | | | |
|---|---|---|---|---|
| 2,738,155 A | * | 3/1956 | McCormick | 248/289.11 |
| 3,017,217 A | * | 1/1962 | Keating | 296/97.13 |
| 3,214,125 A | * | 10/1965 | Pyuro | 248/289.11 |
| 4,529,157 A | * | 7/1985 | Suman et al. | 248/291.1 |
| 4,729,590 A | | 3/1988 | Adams | |
| 4,756,570 A | * | 7/1988 | Cooper | 296/97.13 |
| 4,913,484 A | | 4/1990 | Dowd et al. | |
| 5,031,954 A | | 7/1991 | Peterson et al. | |
| 5,056,853 A | | 10/1991 | Van Order | |
| 5,062,608 A | | 11/1991 | Phelps et al. | |
| 5,082,322 A | | 1/1992 | Cekander et al. | |
| 5,201,564 A | | 4/1993 | Price | |
| 5,242,204 A | | 9/1993 | Kitterman et al. | |
| 5,314,227 A | | 5/1994 | Weiland et al. | |
| 5,451,022 A | | 9/1995 | Peterson | |
| 5,499,854 A | | 3/1996 | Crotty, III et al. | |
| 5,544,928 A | | 8/1996 | Mori et al. | |
| 5,765,897 A | | 6/1998 | Snyder et al. | |
| 5,967,589 A | | 10/1999 | Spadafora | |
| 6,003,928 A | | 12/1999 | Curtindale | |
| 6,015,126 A | | 1/2000 | Murdock | |
| H1834 H | | 2/2000 | Wilson et al. | |
| 6,021,986 A | | 2/2000 | Murdock | |
| 6,068,323 A | | 5/2000 | Brown et al. | |
| 2002/0089210 A1 | | 7/2002 | Beaver | 296/97.9 |

FOREIGN PATENT DOCUMENTS

EP 0 746 476 B1 4/2000

* cited by examiner

*Primary Examiner*—Dennis H. Pedder
(74) *Attorney, Agent, or Firm*—Bill C. Panagos

(57) ABSTRACT

A mount assembly and method of installing a headliner and a visor in a vehicle having a mounting surface. Initially, a first bracket is attached to a headliner. A second bracket is attached to an arm of a visor. A retainer is preferably attached to the second bracket in a snap-fit engagement, and temporarily attaches the first bracket to the second bracket, thereby defining a modular headliner assembly. The headliner assembly is then positioned adjacent the mounting surface. The second bracket is then moved relative to the first bracket, preferably by rotating, such that the mounting surface is disposed between portions of the first and second brackets, thereby securing the headliner assembly to the mounting surface. The retainer then no longer functions to temporarily attach the first bracket to the second bracket. Preferably headliner assembly is assembled in a manufacturing facility and subsequently transported to a vehicle assembly facility for securing to the mounting surface.

7 Claims, 5 Drawing Sheets

INTERIOR TRIM ATTACHMENT APPARATUS AND METHOD FOR A VEHICLE

BACKGROUND OF THE INVENTION

The present invention relates to attachment devices and more particularly to a mount assembly and method for securing a visor to a vehicle mounting surface.

When driving a vehicle it is desirable to shield an occupant's eyes from glaring sunlight which enters the vehicle interior through the windshield or the side windows. As a result, vehicle interiors are usually equipped with sun visors.

Visors typically include a visor body and a pivot rod assembly. The pivot rod assembly typically includes an L-shaped pivot rod, a torque control, and a means for mounting the rod to the vehicle roof and/or headliner. The torque control rotationally mounts the visor body to the pivot rod. The torque control allows the visor body to be moved between, and held at, various rotational positions with respect to the rod. This allows the visor to be moved between a lowered position adjacent the windshield or side window to a raised position adjacent the roof and/or headliner. Typically, visor mount assemblies require the use of fasteners and a tool to install and/or remove the visor in a vehicle.

A number of methods have been proposed for mounting the pivot rods to the roof and/or headliner. One known method is disclosed in U.S. Pat. No. 5,031,954 to Peterson. U.S. Pat. No. 5,031,954 discloses a mounting bracket and arm assembly for a sunshade including an inner bracket having an integrally formed square boss that is inserted into a corresponding hole in the sheet metal roof of a vehicle. A bracket arm is snapped into the inner bracket, and includes a key that fits within an arcuate keyway in the inner bracket to initially lock the inner bracket in place, and thereafter limit the range through which the sunshade may pivot about a vertical axis. However, a tool is required to remove the sunshade after it has been mounted. Therefore, it would be advantageous to provide an improved interior trim attachment apparatus for an automotive vehicle.

SUMMARY OF THE INVENTION

This invention relates to an improved mount assembly and method for securing a visor to a vehicle mounting surface. Initially, a vehicle mounting surface having an aperture formed therein is provided. A bracket assembly is also provided. The bracket assembly includes a first bracket having an opening therethrough, an arm, and a stop tab disposed on the perimeter of the opening. A second bracket includes an upper flange, a tab receiving channel, a lower flange, and a bore formed therethrough. A spring is disposed between the first bracket and the second bracket, and a retainer is disposed about the second bracket. A visor arm is disposed within the bore of the second bracket, such that the second bracket is movable between a first position and a second position when the visor arm is rotated in a first direction. The second bracket is then inserted within the first bracket opening, such that the retainer retains the second bracket within the first bracket opening. The arm of the first bracket is then inserted into the mounting aperture of the mounting surface. The visor arm is then rotated in the first direction so as to move the second bracket to the second position, such that the second bracket is caused to rotate about a central axis. The stop tab enters the tab receiving channel and is held therein so as to prevent the second bracket from being withdrawn through the first bracket opening, thereby securing the bracket assembly to the mounting surface.

Various objects and advantages of this invention will become apparent to those skilled in the art from the following detailed description of the preferred embodiment, when read in light of the accompanying drawings.

DETAILED DESCRIPTION OF THE INVENTION

Figure 1:
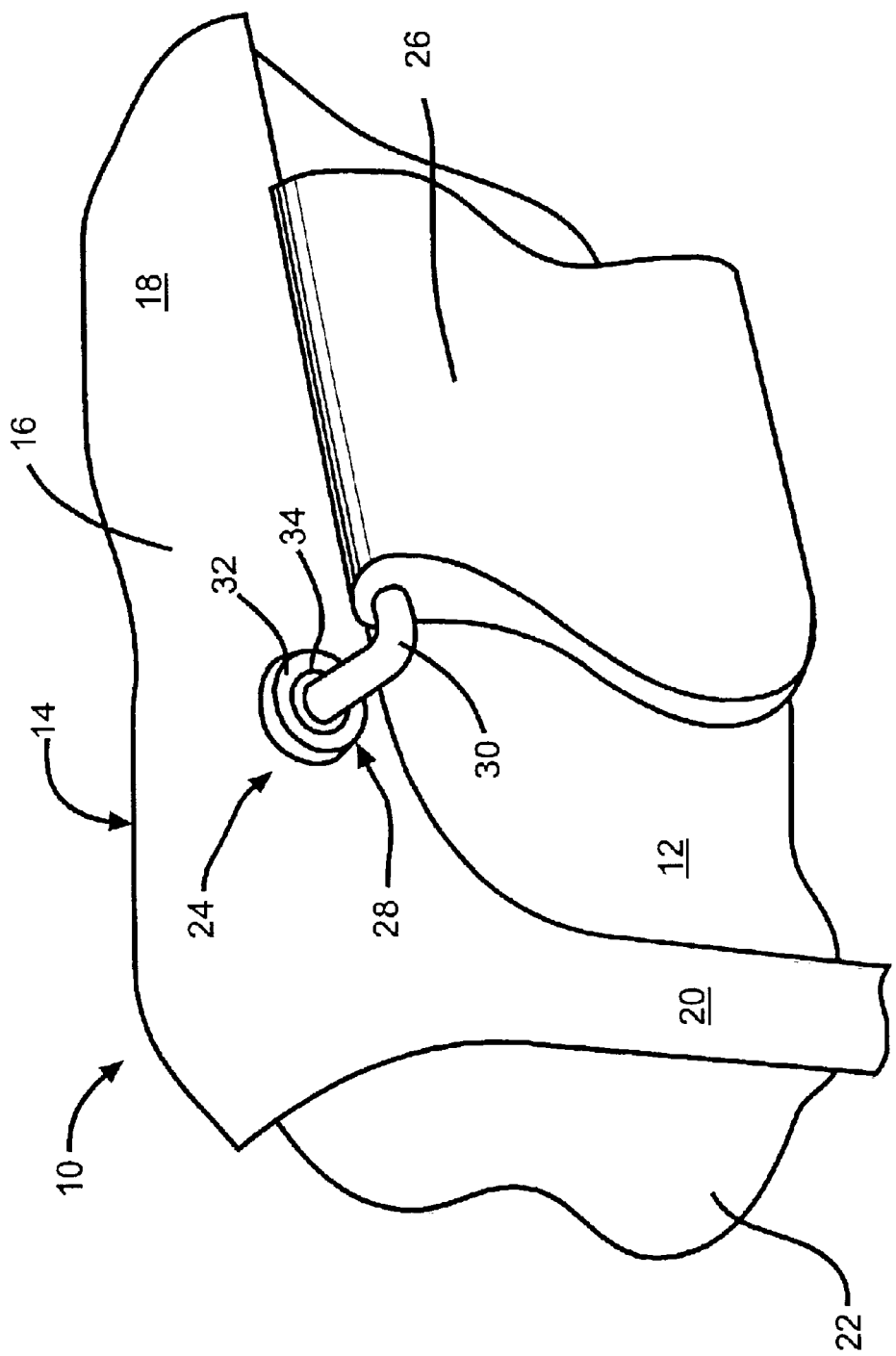
FIG. 1 is a fragmentary perspective view of a sun visor assembly according to the invention, as installed in a vehicle.

Referring to FIG. 1, a vehicle 10 includes a windshield 12 and a mounting surface or roof 14. Preferably, the roof 14 is formed of sheet metal, although such is not required. The roof 14 provides structural support for the vehicle interior, and is typically covered by a headliner 16 having an upholstered surface 18 to provide an aesthetically pleasing appearance to the vehicle.

The vehicle further includes a windshield pillar 20 separating the windshield 12 and a side window 22. A sun visor assembly 24 is shown on the driver's side of the vehicle. The sun visor assembly 24 includes a visor body 26, and a visor mount or bracket assembly 28.

Preferably, the visor body 26 includes a substrate formed from plastic, foam, or pressboard. The substrate can also be formed of any desired material. The substrate is preferably covered with cloth or vinyl. The sun visor assembly 24 preferably includes a visor arm 30 for mounting the visor body 26 to a mounting surface, such as the sheet metal of the vehicle roof 14, as will be described below, and a torque control (not shown). The torque control rotationally mounts the visor body 26 to the visor arm 30, and is preferably mounted within the visor body 26. The torque control can be any desired type of torque control that allows the visor body 26 to be moved between, and held at, various rotational positions with respect to the visor arm 30. The torque control allows the visor body 26 to be moved between a lowered position substantially adjacent the windshield 12 or side window 20, and a raised position substantially adjacent the roof 14 and/or headliner 16. The visor arm 30 can also rotate with the visor body 26 from the position substantially adjacent the windshield 12, to the position substantially adjacent the side window 20.

Figure 2:
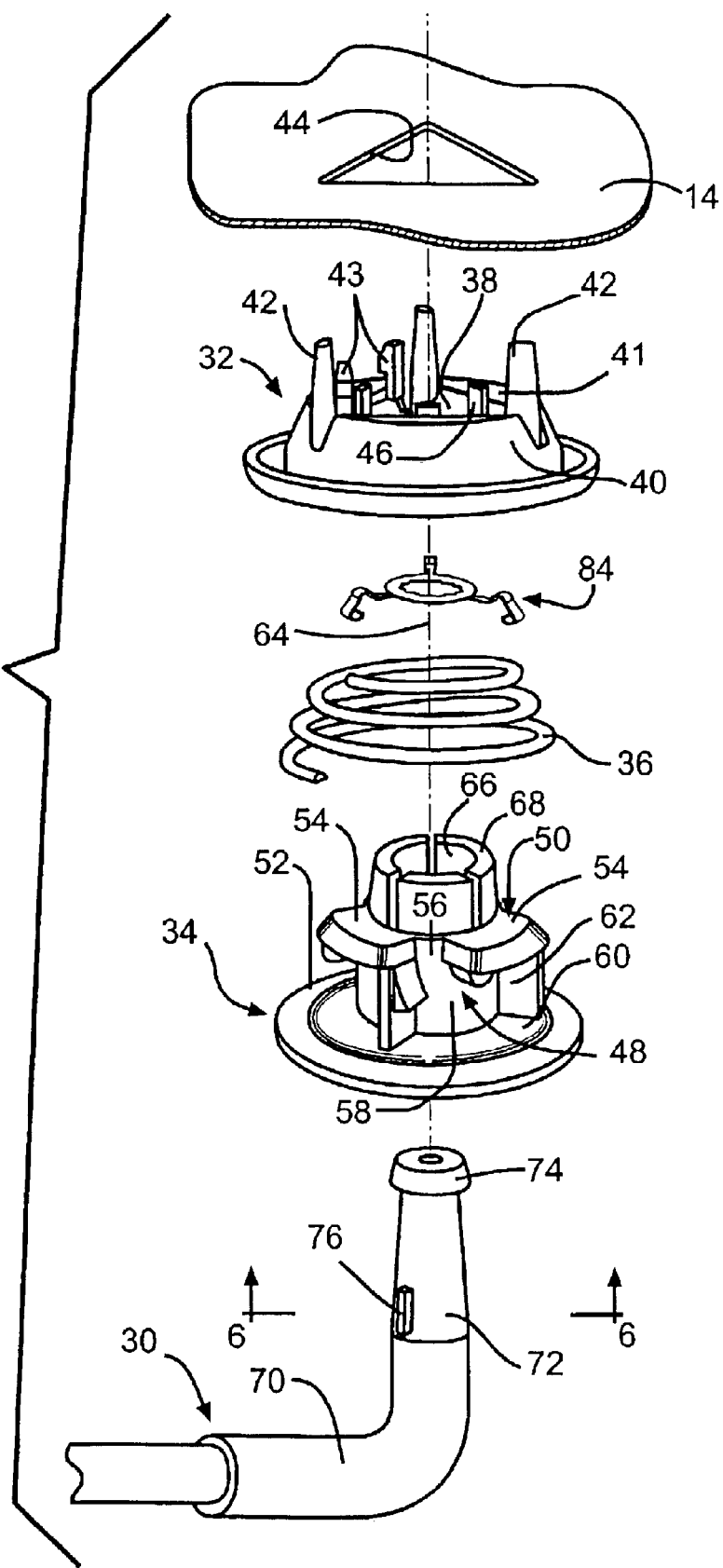
FIG. 2 is an enlarged exploded perspective view of the bracket assembly illustrated in FIG. 1.

As best shown in FIG. 2, the visor bracket assembly 28 includes a first or outer bracket 32, a second or inner bracket 34, a retainer 84, and a coil compression spring 36. An example of such a bracket assembly is disclosed in U.S. Pat. No. 5,451,022 to Peterson, and is incorporated herein by reference.

The outer bracket 32 preferably has a generally circular outer edge, although such is not required. The outer edge of the outer bracket 32 can be any desired shape, such as oval, rectangular, and triangular. The outer bracket 32 includes a coaxially aligned, generally triangular opening 38 therethrough. The opening 38 is defined by a raised inner perimeter 40. The inner perimeter 40 defines a roof-contacting surface 41. A plurality of alignment arms 42 are disposed around the perimeter 40 of the outer bracket opening 38. Preferably, the alignment arms 42 define the three corners of a triangle.

The alignment arms 42 project generally upwardly, as viewed in FIG. 2, from the roof-contacting surface 41 of the outer bracket 32, and are adapted to engage the border of a matching triangular hole 44 cut through the inner sheet metal of the vehicle roof 14.

Resilient locking fingers 43 are preferably provided along two sides of the triangle defined by the alignment arms 42, although such is not required. The outer bracket 32 can include any desired number of locking fingers 43. The locking fingers 43 engage the surface of the roof 14 and temporarily prevent axial removal of the bracket assembly 28 from the roof 14, prior to locking the bracket assembly 28 to the roof 14, as described below. Additionally, the fingers 43 can serve as a means of holding the headliner 16 in place against the sheet metal of the roof 14.

A plurality of stop tabs 46 are disposed around the perimeter 40 of the outer bracket opening 38. Preferably, the stop tabs 46 are arranged with one stop tab 46 substantially centered between each of the three alignment arms 42. The stop tabs 46 project into the outer bracket opening 38 to cooperate with channels 48 in the inner bracket 34, as described below.

As best shown in FIG. 2, the inner bracket 34 includes a sheet metal lock or upper flange 50, a plurality of channels 48 formed therein, and a lower flange or spring seat 52. The upper flange 50 preferably has a size and shape closely corresponding to the outer bracket opening 38 so as to just be insertable therethrough. More preferably, the upper flange 50 includes three arms 54. The channels 48 each include a tab receiver portion 56 opening through the upper flange 50, a substantially lateral groove portion 58 which is preferably partially defined by a middle flange 60, and a tab stop portion 62. Each channel 48 is adapted to receive a corresponding rotation stop tab 46 when the upper flange 50 is inserted through the outer bracket opening 38.

The spring 36 is disposed between the outer bracket 32 and the spring seat 52 of the inner bracket 34 to bias the outer bracket 32 and the inner bracket 34 away from each other.

Figure 3:
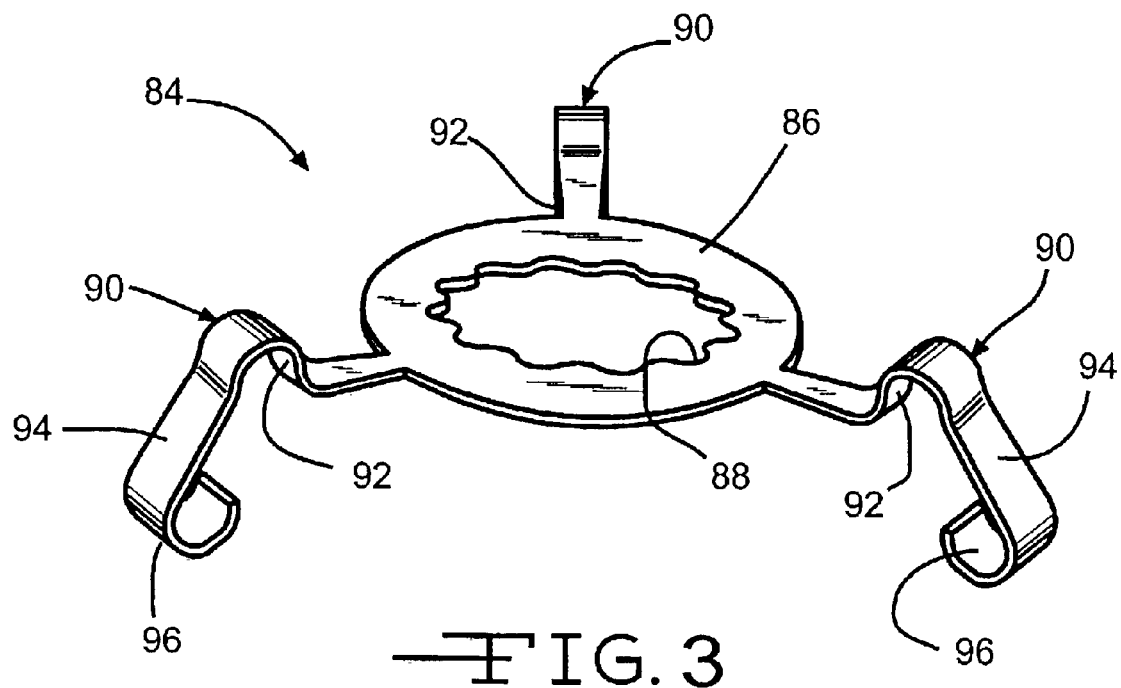
FIG. 3 is an enlarged perspective view of the retainer illustrated in FIG. 2.

The retainer 84, as best shown in FIG. 3, is preferably stamped of spring steel and includes a central body 86. The body 86 includes a central aperture 88 which is preferably disposed about the locking tangs 68 of the inner bracket 34 with a snap fit. The retainer 84 includes a plurality of resilient legs 90, which radiate outwardly from the central body 86. Each of the resilient legs 90 includes an upwardly bent upright portion 92 and a downwardly bent wing 94 which terminates in a retention shoulder portion 96.

Figure 4:
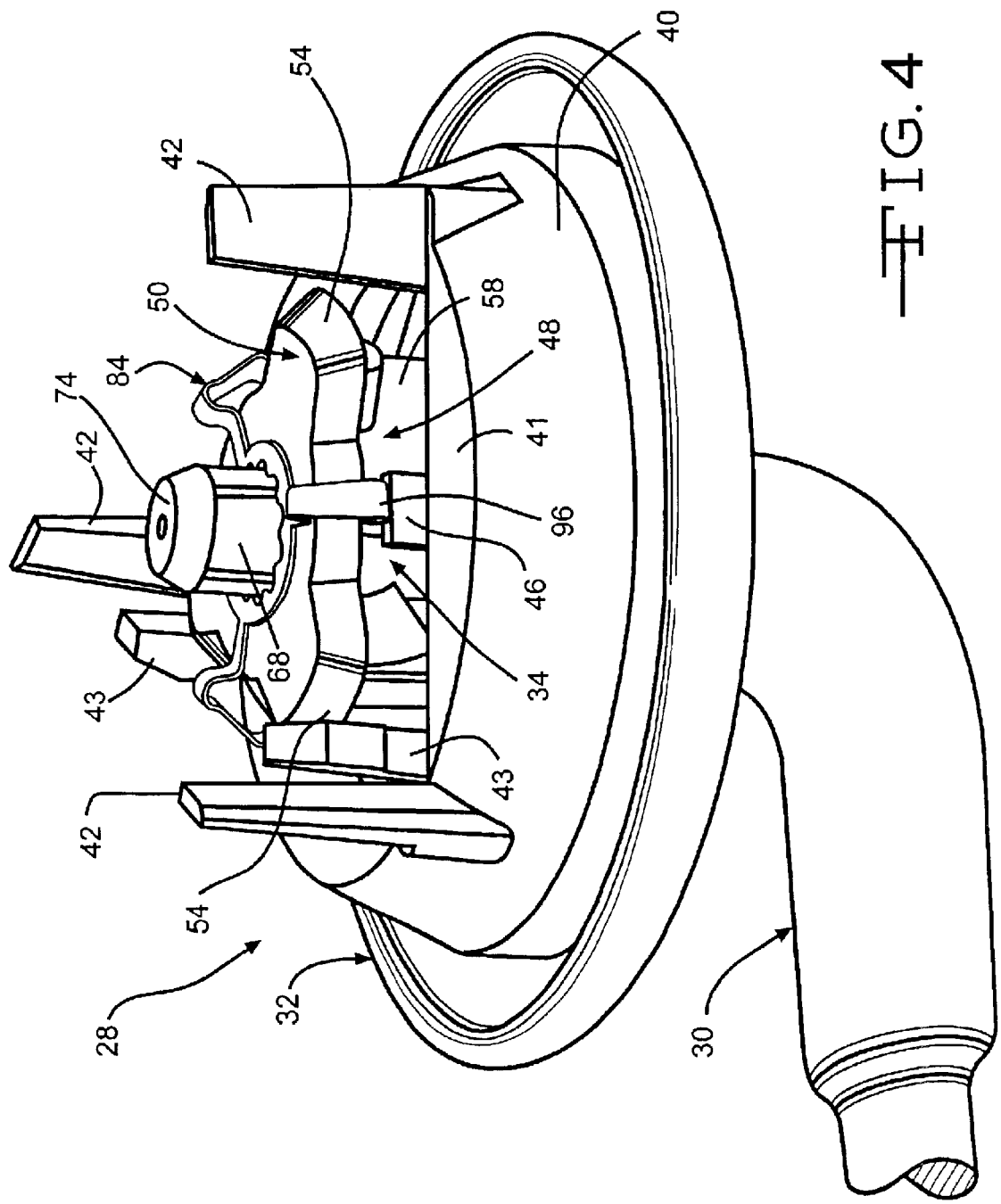
FIG. 4 is an enlarged perspective view of the bracket assembly illustrated in FIG. 2 showing the bracket assembly oriented for insertion into a vehicle roof and with the headliner removed.

Preferably, the inner bracket 34 can be moved to a first position wherein the upper flange 50 is manually or otherwise inserted through the outer bracket opening 38 against the force of the spring 36. The rotation stop tabs 46 are thereby caused to enter the corresponding, and preferably aligned, tab receiver portions 56, as shown in FIG. 4.

Figure 5:
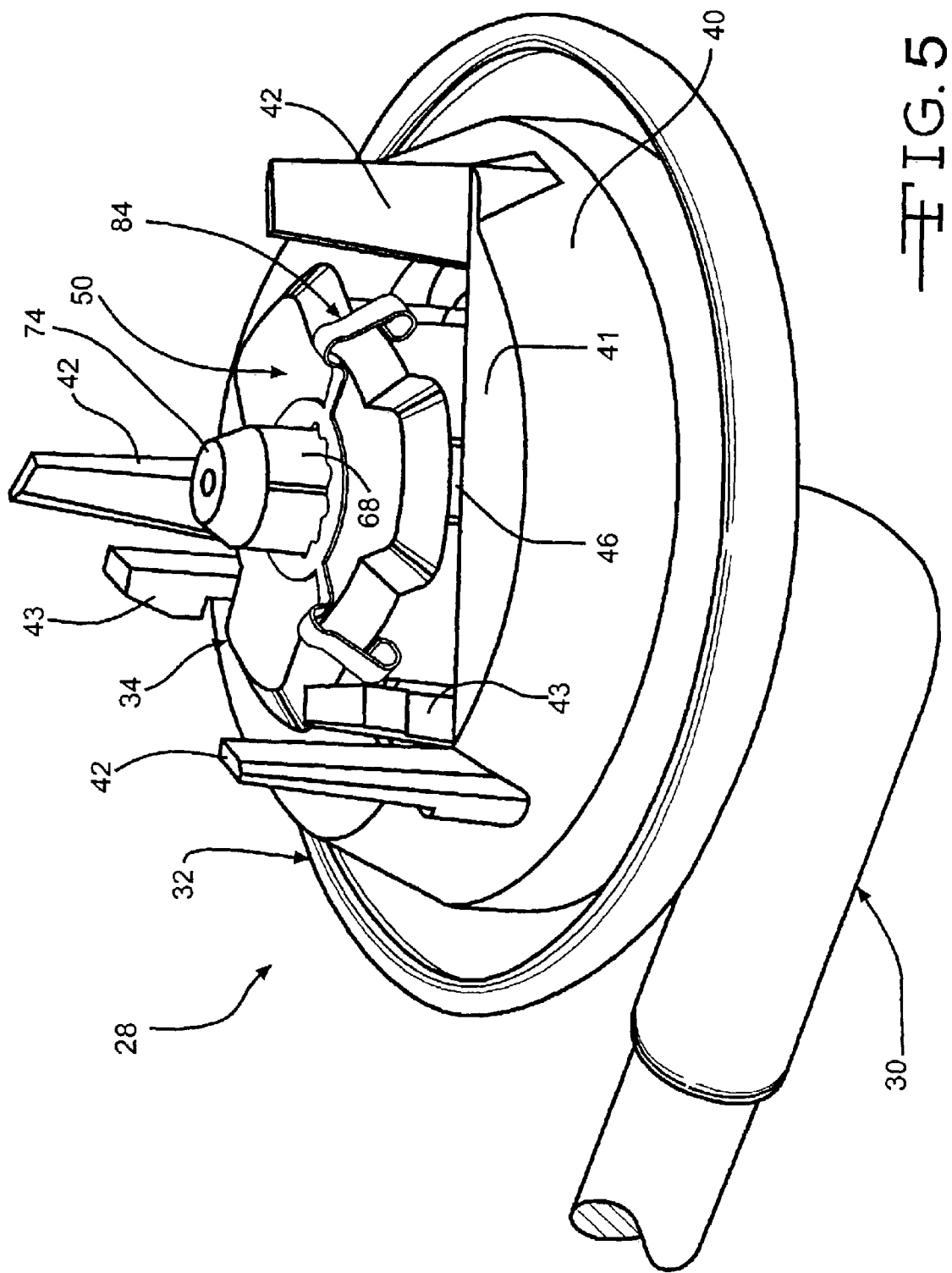
FIG. 5 is an enlarged perspective view of the bracket assembly illustrated in FIGS. 2 and 4 showing the bracket assembly in the locked position with the roof removed.

Preferably, the inner bracket 34 is urged upwardly against the force of the spring 36. The inner bracket 34 is thereafter moved to a second position wherein the visor arm 30 and the inner bracket 34 are rotated in a counterclockwise direction, as viewed from below, about a central axis 64. The axis 64 extends generally perpendicular to an upper face of the upper flange 50. The inner bracket 34 is rotated such that the three arms 54 of the upper flange 50 are offset from the corners of the outer bracket opening 38, as shown in FIG. 5. Preferably, the inner bracket 34 is rotated about 60 degrees, such that the stop tabs 46 are caused to travel through the lateral groove portions 58 until the tabs 46 abut the tab stop portions 62.

After the upward force compressing the spring 36 is relaxed, the stop tabs 46 are drawn upwardly in the tab stop portions 62 and held therein against a lower face of the upper flange 50 to prevent the inner bracket 34 from being withdrawn through the outer bracket opening 38. However, the inner bracket 34 can be removed from the roof 14 of the vehicle by simply reversing the installation process, also without the aid of tools.

A bore 66 is formed through the inner bracket 34 to receive the visor arm 30, as shown in FIG. 2. Preferably, the bore 66 is tapered, although such is not required. A plurality of circularly arranged, resilient locking tangs 68 extend outwardly from the upper flange 50 about the bore 66.

The visor arm 30 is substantially L-shaped and includes a substantially cylindrical first portion 70, a second portion 72, and a head 74. Preferably, the second portion 72 has a tapered shape which corresponds to the taper of the bore 66. The visor arm 30 can then be disposed within the bore 66. Preferably, the visor arm 30 is retained within the bore 66 by the resilient locking tangs 68. Specifically, when the visor arm 30 is axially introduced into the bore 66, the tangs 68 are caused to radially expand and then retract below the head 74, whereat the tangs 68 engage the underside of the head 74.

Figure 6:
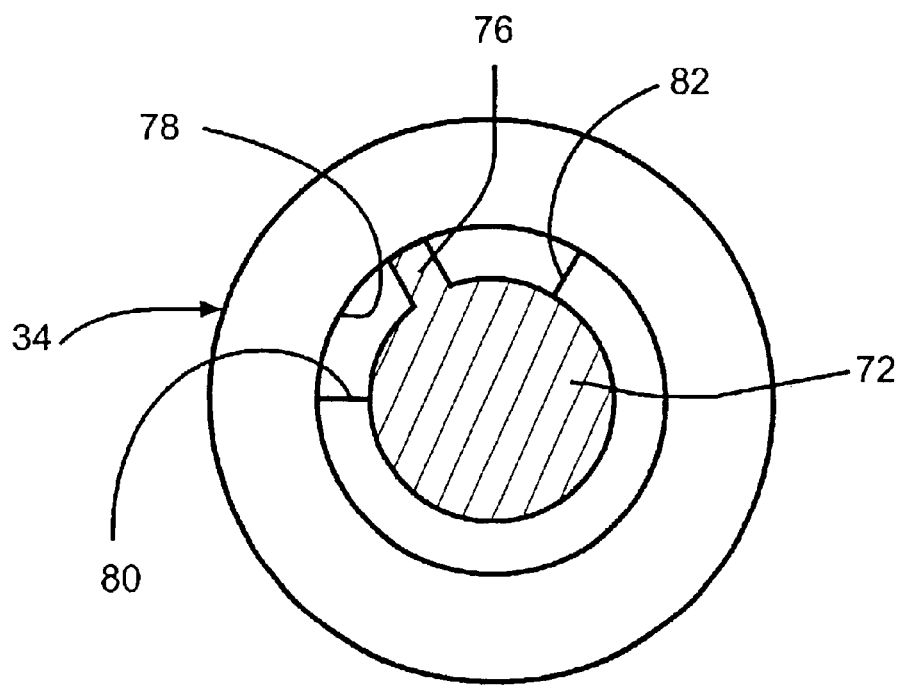
FIG. 6 is a bottom view of the inner bracket illustrated in FIG. 2 showing the arcuate keyway in which the engagement key of the visor arm is disposed.

The second portion 72 of the visor arm 30 includes an axially extending engagement key 76, which is integrally formed with, and extends radially outwardly from, second portion 72 of the visor arm 30, as shown in FIG. 2. The bore 66 of the inner bracket includes a radially outwardly recessed arcuate keyway 78, as shown in FIG. 6, adapted to receive engagement key 76 when the visor arm 30 is disposed within the inner bracket 28, as previously described. Preferably, the arc angle of the keyway 78 is within the range of from about 80 to about 120 degrees, as defined by keyway end-walls 80 and 82, as shown in FIG. 6. The 80 to 120 degree range of motion permits the visor assembly 24 to swing between the practical limits of the front windshield 12 and the driver's side or passenger's side window 22.

The retainer 84 allows the inner and outer brackets 34 and 32 to be pre-assembled and mounted to the headliner 16 in the proper orientation for subsequent insertion into the sheet metal of the roof 14. In one embodiment of the method of the invention, the outer bracket 32 is attached to the headliner 16 by any desired method, such as with an adhesive. The inner bracket 34 is attached to the visor arm 30 as described herein. The retainer 84 is attached to the second bracket 32 by any desired method. Preferably, the retainer 84 is attached to the second bracket 32 in a snap-fit engagement. The outer bracket 32 is then temporarily attached to the inner bracket 34 with the retainer 84, thereby defining a modular headliner assembly. The modular headliner assembly is then positioned adjacent the roof 14. The inner bracket 34 is then moved, preferably by rotating, relative to the outer bracket 32, such that the sheet metal of the roof 14 is disposed between portions of the inner and outer brackets, thereby securing the modular headliner assembly to the roof 14.

Such a method allows for the advantageous assembly of the modular headliner assembly in a manufacturing facility, and the subsequent transport of the modular headliner assembly to a vehicle assembly facility wherein the modular headliner assembly is secured to the vehicle roof 14.

Another embodiment of the method of the invention is illustrated generally in FIG. 2. Specifically, prior to installation of the sun visor assembly 24 into the vehicle roof 14, the outer bracket 32, inner bracket 34, spring 36, retainer 84, and visor arm 30, are assembled to form the bracket assembly 28. To assemble the bracket assembly 28, the spring 36 is disposed about the upper and middle flanges 50 and 60, respectively, such that the spring 36 engages the spring seat 52. The central aperture 88 of the retainer 84 is then disposed about the locking tangs 68 of the inner bracket 34 with a snap fit. The visor arm 30 can then be disposed within the bore 66. Preferably, the visor arm 30 is retained within the bore 66 by the resilient locking tangs 68. Specifically, when the visor arm 30 is axially introduced into the bore 66, the tangs 68 are caused to radially expand and then retract below the head 74, whereat the tangs 68 engage the underside of the head 74.

The inner bracket 34 is then forced through the opening 38 of the outer bracket 32. As the inner bracket 34 and attached retainer 84 pass through the opening 38, the resilient legs 90 engage the stop tabs 46, thereby causing the resilient legs 90 to be deflected inwardly. Once the inner bracket 34 is inserted a predetermined depth through the opening 38 of the outer bracket 32, the resilient legs 90 spring outwardly such that the shoulder portion 96 engages an upper surface of the stop tabs 46, thereby holding the inner and outer brackets 34 and 32 together, as shown in FIG. 4.

The bracket subassembly can then be installed in a vehicle headliner 16, thereby defining the modular headliner assembly. The bracket subassembly can be attached to the headliner 16 by any desired method, such as with an adhesive. Once the headliner 16 is transported to the vehicle, the operator need only insert the outer bracket alignment arms 42 into the hole 44 in the sheet metal of the roof 14, such that the roof-contacting surface 41 is adjacent the roof 14. The visor arm 30 is rotated such that the inner bracket 34 is rotated about 60 degrees to the second position. In the second position, the arms 54 of the upper flange 50 are preferably offset from the corners of the outer bracket opening 38. The sheet metal of the roof 14 is thereby locked between the roof-contacting surface 41 and the arms 54 of the upper flange 50, as shown in FIG. 5.

The visor assembly 24 can be removed from the vehicle after installation by first urging the inner bracket 34 upwardly against the force of the spring 36. The visor arm 30 and the inner bracket 34 can then be rotated about the central axis 64 in a clockwise direction, as viewed from below, such that the inner bracket 34 is moved to the first position. The inner bracket 34 can then be removed from the opening 38 in the outer bracket 32, and the outer bracket 32 removed from the roof 14.

The headliner 16 can be the modular type, as described herein, wherein a plurality of headliner accessories, such as the sun visor assembly 24, are attached to the roof 14 and headliner 16 before the headliner 16 is installed in the vehicle 10. It will be appreciated that the visor bracket assembly 28 provides a simple design which is easy to assemble and pre-install in such a modular type headliner. Additionally, it will be appreciated that the sun visor assembly 24 can also be quickly and efficiently installed in a vehicle after installation of the headliner, such as at a vehicle assembly facility.

The principle and mode of operation of this invention have been described in its preferred embodiment. However, it should be noted that this invention may be practiced otherwise than as specifically illustrated and described without departing from its scope. For example, modifications to the invention can include, but are not limited to, modifying the shape of the bracket, and pivot member and corresponding pivot cavity. In addition, the bracket assembly can be used to secure other interior components in a vehicle. For example, the bracket assembly can be used to attach components to a door panel.

What is claimed is:

1. A mount assembly for securing a visor to a vehicle mounting surface, said mount assembly comprising:
   a first bracket having an opening therethrough, an arm and a stop tab disposed on the perimeter of said first bracket opening, said arm for engaging said mounting surface;
   a second bracket having an upper flange disposed within said first bracket opening, a channel for receiving said stop tab, and a lower flange;
   a spring disposed between said first bracket and said second bracket such that upon insertion of said upper flange of said second bracket through said first bracket opening and rotation of said second bracket about a central axis, said stop tab enters said channel and is held therein to prevent said second bracket from being withdrawn through said first bracket opening; and
   a separate retainer disposed about said second bracket, said retainer retaining said second bracket within said opening in said first bracket.

2. The mount assembly according to claim 1, wherein said retainer is stamped of spring steel.

3. The mount assembly according to claim 1, wherein said retainer comprises:
   a central body having a central aperture formed therethrough, said central aperture disposed about a portion of said second bracket; and
   a resilient leg radiating from said central body, said resilient leg engaging said first bracket.

4. The mount assembly according to claim 3, wherein said retainer includes a plurality of resilient legs.

5. The mount assembly according to claim 1 further including a plurality of said arms disposed on the perimeter of said first bracket opening.

6. The mount assembly according to claim 5 further including a plurality of said stop tabs disposed on the perimeter of said first bracket opening intermediate said plurality of arms.

7. The mount assembly according to claim 1, said arm adapted for extending through an opening in said mounting surface.

* * * * *